June 23, 1925.
1,542,892
C. A. KOENIG
METHOD OF FORMING A SERRATED EDGE
Filed June 1, 1922
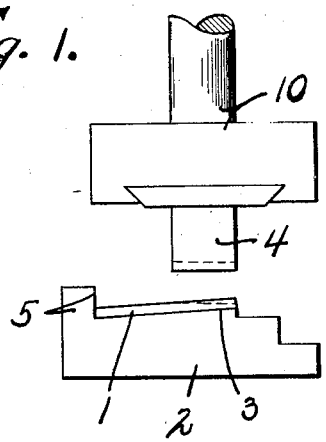
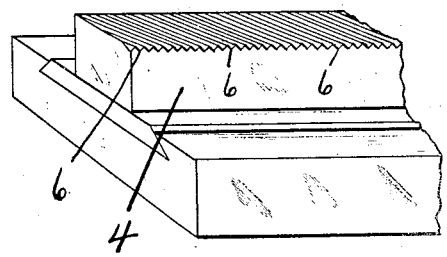
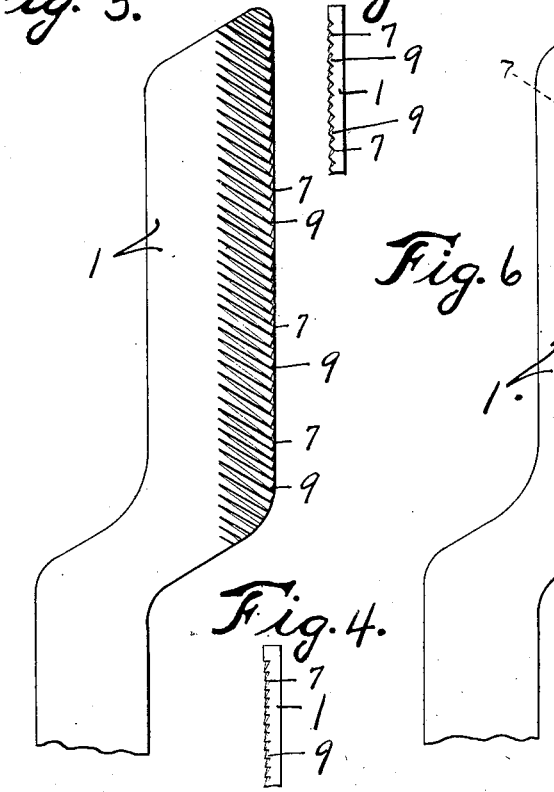
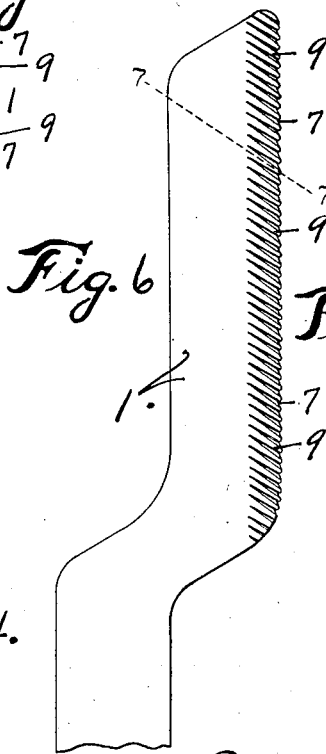
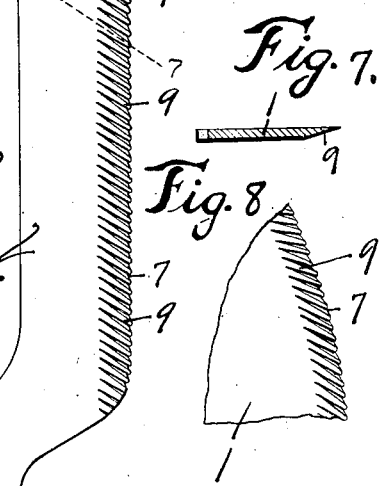
INVENTOR
C. August Koenig
BY
Denison Thompson
ATTORNEYS Patented June 23, 1925.

1,542,892

UNITED STATES PATENT OFFICE.

CONRAD A. KOENIG, OF AUBURN, NEW YORK.

METHOD OF FORMING A SERRATED EDGE.

Application filed June 1, 1922. Serial No. 565,236.

*To all whom it may concern:*

Be it known that I, CONRAD AUGUST KOENIG, a citizen of the United States of America, of Auburn, in the county of Cayuga in the State of New York, have invented new and useful Improvements in Methods of Forming a Serrated Edge, of which the following, taken in connection with the accompanying drawings, is a full, clear, and exact description.

This invention relates to certain improvements in methods of forming a serrated cutting edge.

In a general way it has been customary to form serrated cutting edges by means of a chisel or hammer having a sharpened edge which is caused to strike the knife stock a sharp blow while the latter is cold, to thereby form a groove of proper length and depth. The spacing of such grooves to form intermediate teeth has been effected by moving the knife or blade stock longitudinally or by rotating the stock beneath the chisel, dependent upon the shape of the knife, at a speed so correlated with the operative interval required for a cycle of movement of a chisel as to form teeth of a fairly uniform desired size.

This method has considerable disadvantages—among others it is quite impossible to serrate a cutting edge up to the end portions thereof to form a full serrated edge, because of the fact that the blows of the hammer or chisel upon cold metal would break and crack the metal. Further, the forming of grooves by hammer blows deforms or warps the metal, necessitating its straightening or re-formation.

In addition, the process requires considerable labor and time in that after the proper blank has been produced and the serrations separately formed thereon, it is necessary to heat the article to a temperature suitable for hardening, and then immerse it in oil or other suitable medium for tempering, after which the knife is ground.

Further, it is necessary to sharpen the chisel or groove forming hammer at frequent intervals in order to obtain teeth of any approximate regularity.

With my process it is possible to produce accurately formed and shaped serrations up to the very ends of the blade, eliminating all waste of stock and producing a more efficient article, in addition to the fact that the serrations are more uniformly and perfectly shaped.

Further, the teeth being produced by the application of a pressure gradually applied to the metal blank lacks the defects resultant from the application of hard blows to cold metal, and are of a materially increased uniformity of strength.

Further, the cost of production is materially reduced by reason of the fact that the entire edge of a cutting blade can be serrated at a single operation. And by reason of the fact that the metal is necessarily heated to a high temperature when the pressing operation is performed, it then can be immersed in oil or other suitable medium, whereby the heating which permits the formation of the serrations can at the same time be utilized for tempering.

Other objects and advantages relate to the details of the cutting edge and the method, all as will more fully appear from the following description taken in connection with the accompanying drawings, in which:—

Figure 1 illustrates diagrammatically the parts of a press with a knife stock or blank in position for the pressing operation.

Fig. 2 illustrates a die for forming serrations upon a straight blade.

Fig. 3 illustrates a knife or cutting blade in the form when removed from the press.

Fig. 4 is an edge view of a portion of the blade of Fig. 3.

Fig. 5 is a similar view illustrating grooves of slightly different form.

Fig. 6 is a view similar to Fig. 3 after the grinding operation has been performed Fig. 7 is a section on line 7—7, Fig. 6.

Fig. 8 illustrates the invention as applied to a blade of arcuate or circular form.

My invention is illustrated in connection with an article known as a band knife, but it will be understood that its description in connection with such an article is equally descriptive of its application to any knife blade or cutting edge. Preferably, I first form or shape a piece of metal stock to the desired form of the knife or cutting edge to be produced, as for instance, the band knife partially illustrated in Figure 3.

This piece of metal so shaped is then heated to a desired temperature, as for instance, 1200 degrees or any other suitable temperature which will permit deformation of the article by reasonable pressure, and when so heated, this blade or piece of metal 1 is placed upon a supporting bed plate 2, which may, as shown, have an inclined surface 3, the inclination of which with respect to the lower face of the die 4 will determine somewhat the length and depth of the grooves or corrugations formed in the blade 1. Preferably, the bed plate 2 has suitable guides or walls 5 for properly positioning a particular form of blank or blade, altho that may not be essential. The die 4 is formed with a series of grooves properly shaped and related so as to constitute a counterpart of the grooves 7 which it is desired to press or form in the blade 1. This die may be mounted upon or secured to the movable element 10 of a press so as to be brought into pressing relation with the said blade 1. By operating the press, the die 4 will form in the heated blade a series of grooves of the length and depth desired, as shown in Figs. 3 and 4. Preferably, the grooves are pressed only part way thru the stock of blade 1, and as illustrated, they extend at the edge or deepest point about halfway through so that when the blade is later ground upon the opposite side, a symmetrical toothed edge is produced. The grooves 6 in the die illustrated may be of a shape to form corrugations, teeth or ridges 9 of any desired cross-sectional formation, as for instance, in the form of an equilateral triangle, a right-angle triangle, or otherwise, altho the right angle triangle is perhaps preferred.

After the groove 7 has been formed upon the blank it is removed from the press and in its heated condition is tempered by dipping in oil. The blank or blade is then in the form shown by Fig. 3 and the side opposite that upon which the grooves 7 are formed is ground, as indicated in Figs. 6 and 7 so as to form a series of teeth, which constitute the operative portion of the cutting edge. The knife is then in condition for use and for additional grinding, should that be desired.

It will be obvious that my process permits of the production of a full serrated edge in which the teeth are of regular and uniform shape, or of any predetermined shape desired, dependent upon the formation of the die used, and that the process of production can be carried out at a materially reduced expense and that the blade is not warped, weakened or cracked by the application of sudden and hard blows, and that the resultant teeth or serrations have not been subjected to high temperature after formation.

Further, my invention is applicable to any form of knife and to the production of any character of serrations, either regular or irregular, and altho I have illustrated particular forms of grooves and teeth, and particular shapes of knives to which the same are applied, I do not desire to limit myself to the details of form, construction or arrangement, as various changes may be made in the process without departing from the invention as set forth in the appended claims.

I claim:

1. The method of producing a serrated edge, comprising shaping a flat metal knife blank, heating the blank, pressing in one surface of the blank while the blank is in heated condition a multiplicity of simultaneously formed grooves deepening toward one edge of the blank and extending only partially through the blank at their edge and without changing the flat character of the opposite surface of the blank, and then grinding the blank so formed upon the said flat surface opposite that in which the grooves are formed until a serrated cutting edge is produced.

2. The method of producing a serrated edge, comprising shaping a flat metal knife blank, heating the blank, subjecting the heated blank while supported in an inclined position upon a plane surface to pressure applied by a substantially horizontally disposed corrugated surface whereby a multiplicity of grooves deepening toward one edge of the blank are simultaneously formed in one surface thereof without changing the flat character of the opposite surface, immersing the blank in a tempering medium, and then grinding the blank upon the flat surface opposite the formed grooves until a serrated edge is produced.

In witness whereof I have hereunto set my hand this 23rd day of May, 1922.

C. A. KOENIG.

Witnesses:
E. M. FRADENBURGH.
M. C. RILL.